(No Model.) 4 Sheets—Sheet 2.
F. WESEL.
MACHINE FOR CUTTING PRINTERS' RULES AND LEADS.
No. 484,984. Patented Oct. 25, 1892.

WITNESSES:
Charles Schroeder
William Diehm

INVENTOR
Ferdinand Wesel
BY
Druck Raegener
ATTORNEYS.

(No Model.) 4 Sheets—Sheet 3.

F. WESEL.
MACHINE FOR CUTTING PRINTERS' RULES AND LEADS.

No. 484,984. Patented Oct. 25, 1892.

WITNESSES:
Charles Schroeder
William Duhm

INVENTOR
Ferdinand Wesel
BY
ATTORNEYS.

(No Model.)  4 Sheets—Sheet 4.
F. WESEL.
MACHINE FOR CUTTING PRINTERS' RULES AND LEADS.
No. 484,984. Patented Oct. 25, 1892.
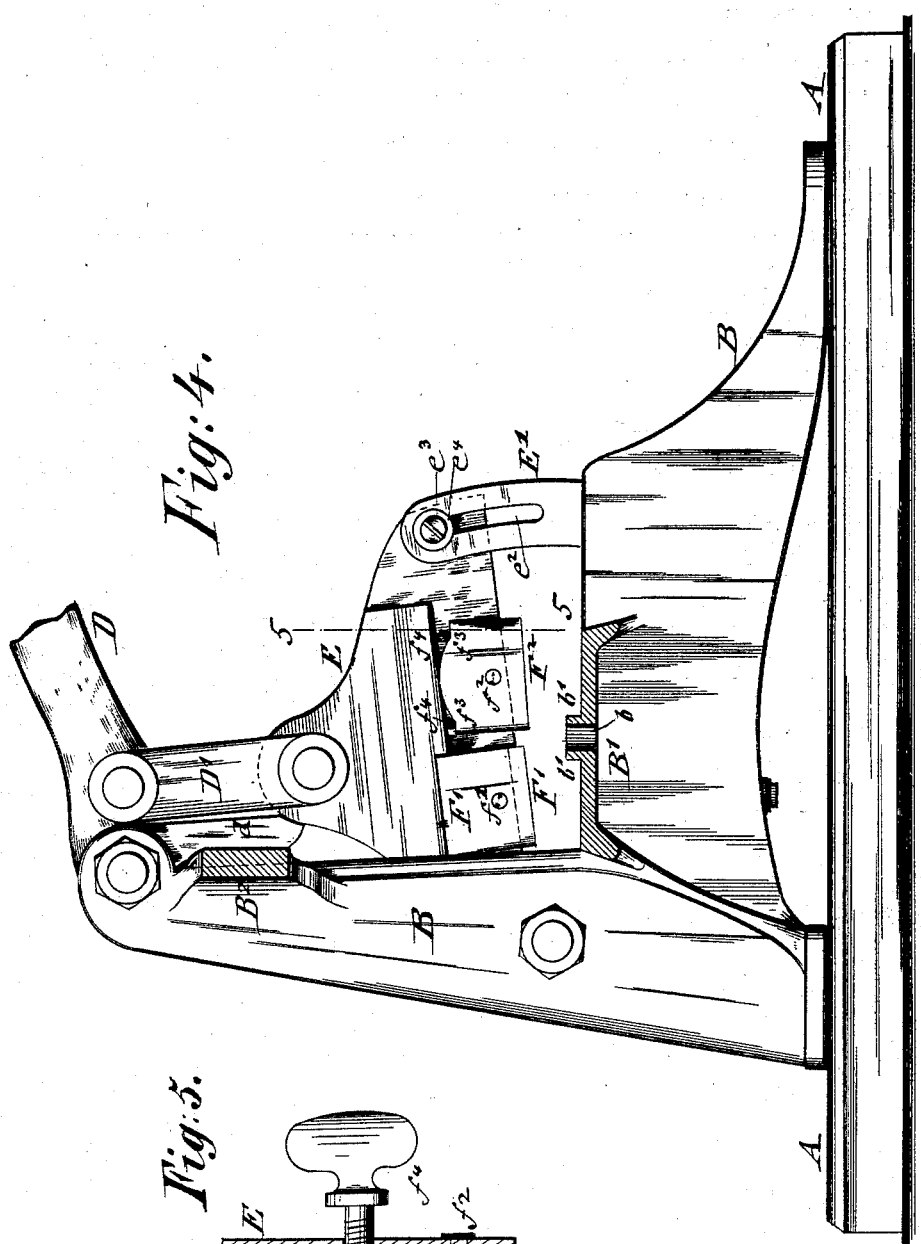

UNITED STATES PATENT OFFICE.

FERDINAND WESEL, OF NEW YORK, N. Y.

MACHINE FOR CUTTING PRINTERS' RULES AND LEADS.

SPECIFICATION forming part of Letters Patent No. 484,984, dated October 25, 1892.

Application filed July 19, 1892. Serial No. 440,490. (No model.)

*To all whom it may concern:*

Be it known that I, FERDINAND WESEL, a citizen of the United States, and a resident of the city, county, and State of New York, have invented certain new and useful Improvements in Machines for Cutting Printers' Rules and Leads, of which the following is a specification.

This invention relates to an improved machine for cutting printers' rules and leads to any desired length, and also to bevel them at the edges, in which a cutter knife or blade is arranged for the beveling of the rules and another one for cutting off the rules and leads.

The invention consists of a machine for cutting printers' rules and leads, which comprises an upright supporting-frame having a horizontal slotted guide-arm and a stationary knife or cutter, an oscillating knife-holder that is pivoted to said supporting-frame and provided with a fixed beveling-knife and with a second knife that can be arranged parallel with or at an angle of inclination to the stationary knife by means of suitable set-screws, so as to cut printers' rules or leads, as required. The upright standard of the supporting-frame is connected with the horizontal guide-arm by a slotted quadrant, on which an inclined guide-plate for the rules to be beveled is adjusted, the beveling being accomplished in connection with the stationary knife of the main frame and a vertically-guided and spring-actuated follower that is arranged below the fixed cutting-knife of the oscillating knife-holder. The horizontal guide-arm is further provided with an adjustable gage for shorter rules and with a second adjustable gage for rules of greater length, as will be fully described hereinafter, and finally pointed out in the claims.

Figure 1:
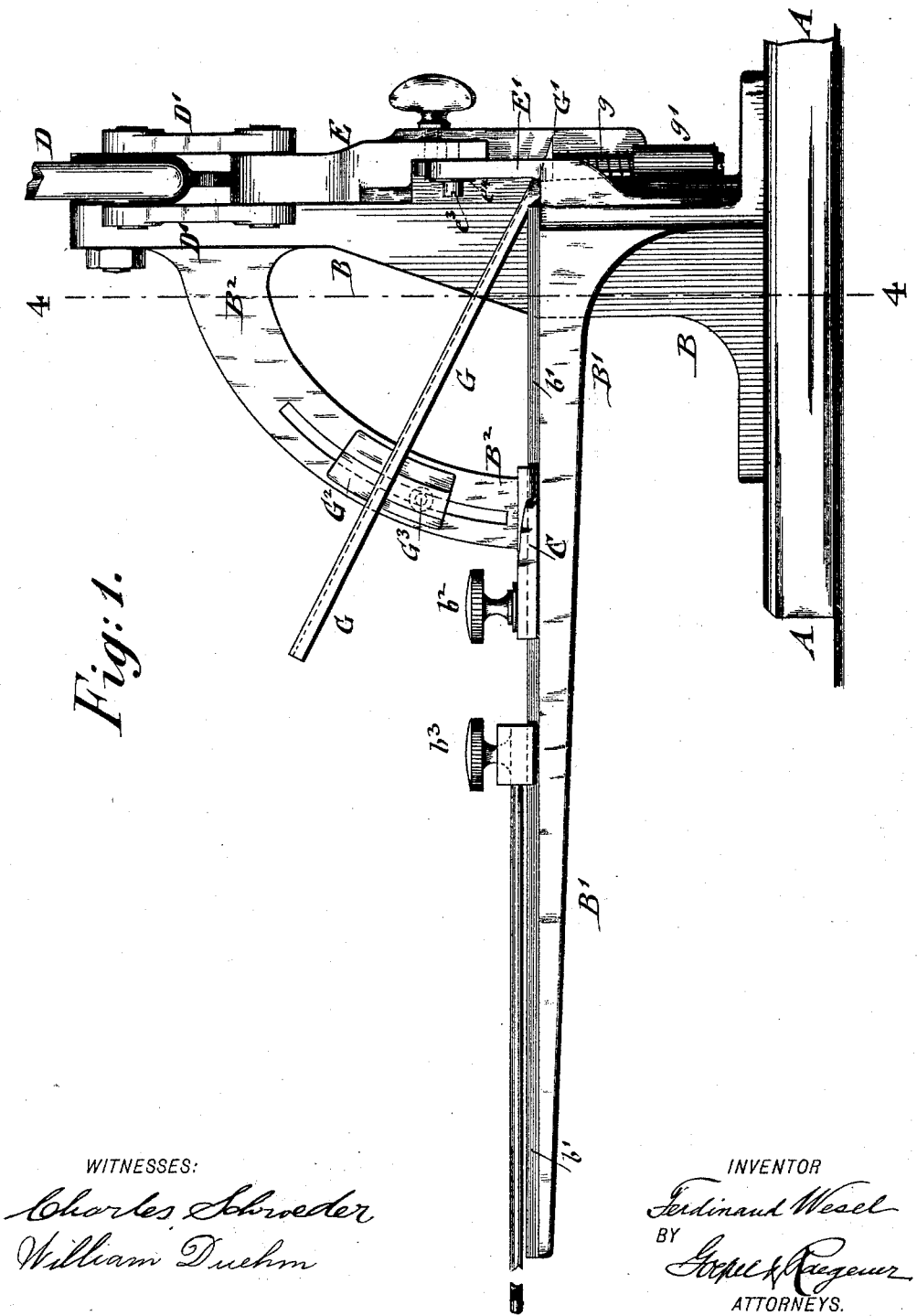
Figure 2:
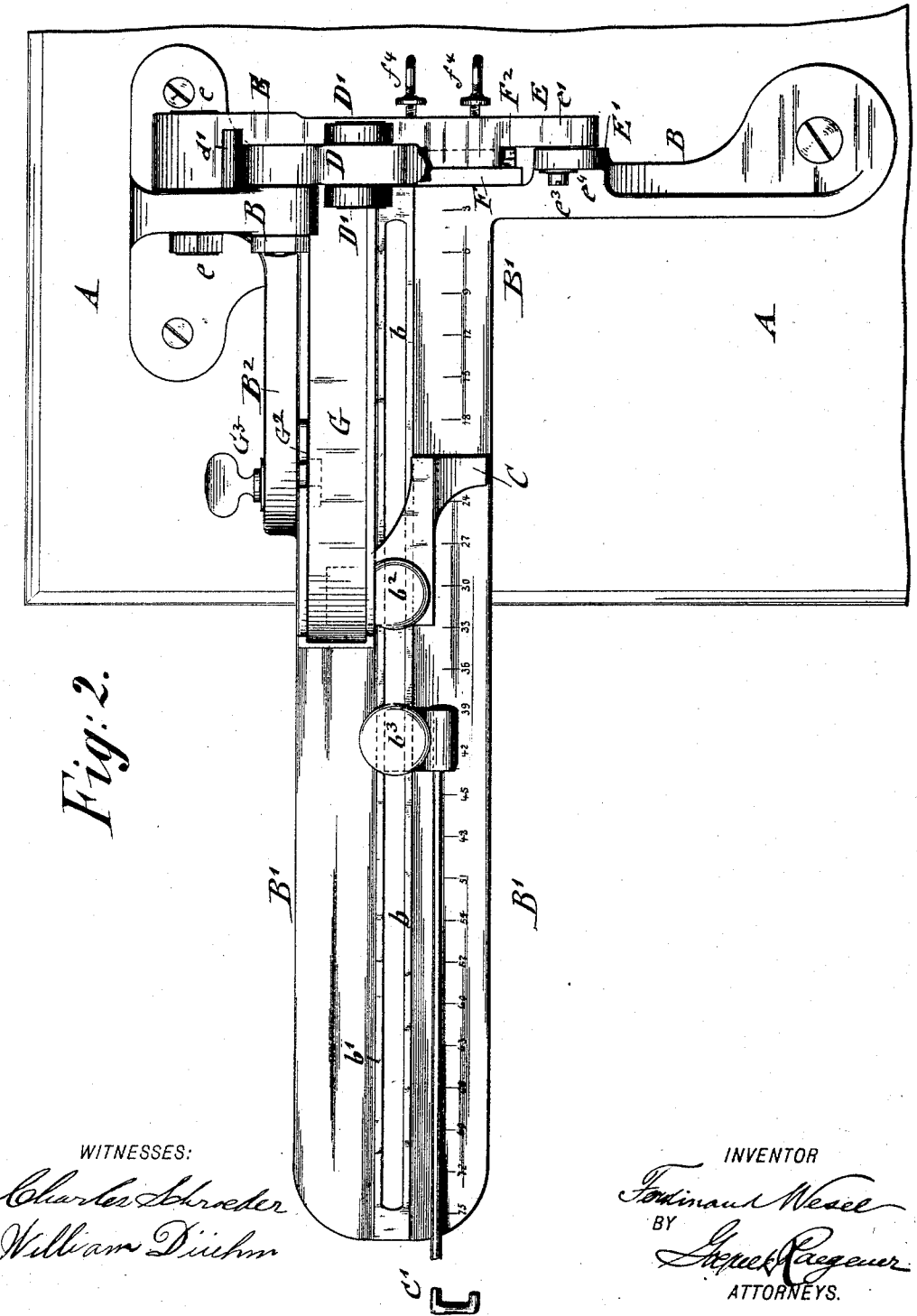
Figure 3:
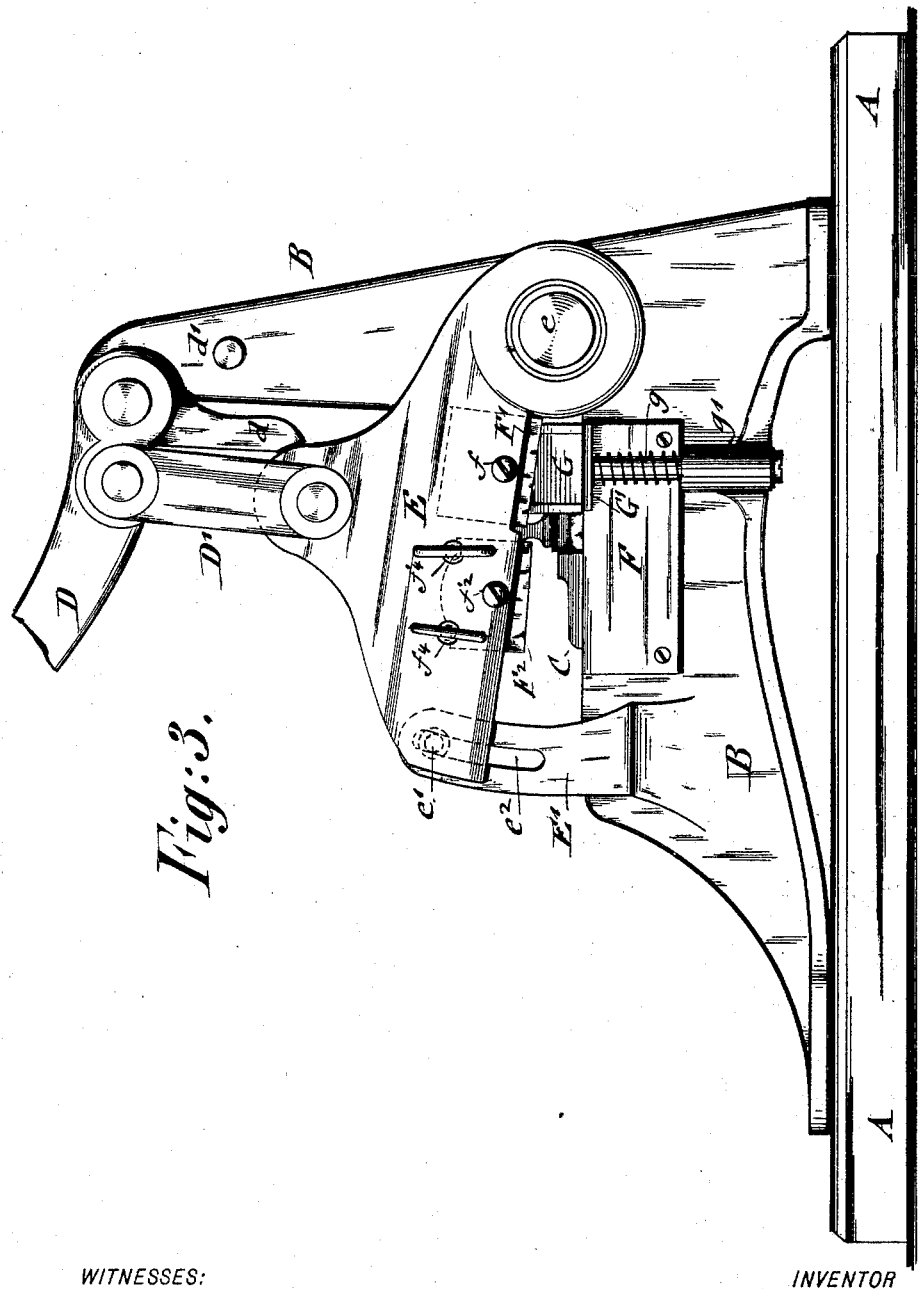

In the accompanying drawings, Figure 1 represents a front elevation of my improved machine for cutting printers' rules and leads. Fig. 2 is a plan of the machine. Fig. 3 is an end elevation of the same. Fig. 4 is a vertical transverse section on line 4 4, Fig. 1; and Fig. 5 is a detail vertical transverse section on line 5 5, Fig. 4, of the adjustable cutting-knife on the oscillating knife-holder.

Similar letters of reference indicate corresponding parts.

Referring to the drawings, A represents the base-plate of my improved machine for cutting printers' rules and leads.

B is an upright standard that is attached to the base-plate A, and which is provided with a horizontal laterally-extending guide-arm B', that is preferably cast in one piece with the upright standard B. The horizontal arm B' is provided with a longitudinal slot $b$ and vertical guide ribs or flanges $b'$ at both sides of said slot for the purpose of adjusting a gage C, which is used for shorter rules or leads, and which is guided in the slot and secured to the guide-arm B' by a suitable set-screw $b^2$, or a second longer gage C', that extends beyond the horizontal guide-arm B' and is adjusted in the slot $b$ of the guide-arm B' in the same manner as the gage C by a set-screw $b^3$, so as to be used whenever it is desired to cut rules or leads of greater length than the horizontal guide-arm B. When using the longer gage C', the gage C is removed from the guide-arm B'.

A lever D is pivoted to the upper part of the upright standard B and connected in front of its pivot by two pivot-links D' with a knife-holder E, which is pivoted at its rear end to a pivot $e$ of the upright standard B, and which is guided at its front end by means of a headed screw $e'$ in the arc-shaped slot $e^2$ of an upwardly-extending lug E', which latter is preferably made integral with the supporting-standard B. A washer $e^4$ is interposed between the head $e^3$ of the screw $e^2$ and the lug E', so as to guide the knife-holder E in its up-and-down motion and prevent it from giving or moving away from the stationary knife or blade F, which is attached to the lower part of the upright standard B, as shown clearly in Fig. 3. By the connection of the outer end of the knife-holder E with the stationary lug E' of the supporting-frame B the knife-holder E is compelled to move closely to the stationary knife F of the supporting-frame B, so that an accurate and effective cutting action of the knives of the knife-holder E takes place. The operating-lever D is provided at its rear end with a downwardly-extending arm $d$, against the lower end of which the upper part of the knife-holder E abuts when the latter is in raised position, as shown in Fig. 3, while the arm $d$ abuts against a stationary pin $d'$ when the lever D and the knife-holder E are lowered for producing the cutting off or beveling of the rules or leads. The lower part of the knife-holder E is recessed at its inner side, so as to support, in connection with a set-screw $f$, a fixed knife F′, which is arranged at the rear of the cutter-holder and which serves for beveling or mitering the edges of printers' rules whenever such beveling is required. The rules are guided toward the stationary knife F and fixed knife F′ of the knife-holder E along an inclined and adjustable guide-plate G, which extends in a downward direction close to the edge of the stationary cutting-knife F and which is provided with side flanges, so as to guide the rules which are to be beveled along the inclined guide-plate toward the cutting-knives F and F′. Below the fixed cutting-knife F′ is arranged a vertically-guided and spring-actuated follower G′, against which the edge of the fixed cutting-knife F′ presses, so as to force it in a downward direction against the tension of its spring until the beveling action is accomplished. The follower G′ serves as a rest for the edge of the rule to be beveled, so that only that portion that is to be beveled or mitered is presented to the action of the cutting-knife F′. The shank $g$ of the follower G′ is guided in a fixed socket $g'$ of the lower part of the upright standard B, as shown clearly in Fig. 3. The upper end of the inclined guide-plate G is guided by a segmental plate $G^2$ and clamp-screw $G^3$ in the arc-shaped slot of a quadrantal arm $B^2$, which extends from the upright standard B to the horizontal guide-arm B′, and which is preferably cast integral with the standard and guide-arm. The segmental plate $G^2$ extends at right angles to the guide-plate G and is firmly clamped to the quadrantal arm $B^2$ by the set-screw $G^3$, as shown in Figs. 1 and 2, when the guide-plate G is placed at the proper inclination to the arm B′. The rule or lead to be beveled is then placed on the inclined guide-plate G, so that its lower edge abuts against the follower G′. The rule is then held in this position and the lever D lowered, so that the knife-holder E is oscillated in a downward direction and the cutting-knife F′ of the same cuts off the projecting portion of the lower edge of the rule, so as to impart a bevel to the same, the angle of which corresponds to the angle of inclination at which the guide-plate G is adjusted on the quadrantal arm $B^2$. The cutter-holder E is provided adjacent to the fixed knife F′ with a second adjustable knife $F^2$, which is connected to the cutter-holder by a set-screw $f^2$, and the upper edge of which is provided with an arc-shaped portion and with shoulders $f^3$ at each end, as shown clearly in Fig. 4. Set-screws $f^4$, with conically-pointed ends, are arranged in the cutter-holder, one above each shoulder $f^3$ of the adjustable cutting-knife $F^2$, said set-screws serving to hold the cutting-knife $F^2$ in the required position after the same is adjusted, either parallel with the stationary cutting-knife F or at a suitable inclination thereto, according as lead or brass rules have to be cut off. When leads are to be cut, the edge of the adjustable knife $F^2$ is set parallel with the edge of the stationary cutting-knife F, while when brass rules, which are of greater hardness, are to be cut off the edge of the knife is adjusted by means of the set-screws $f$ to an angle of inclination toward the edge of the stationary cutting-knife F.

By the arrangement of two separate knives, of which the fixed cutting-knife F′ serves for beveling the edges of printers' rules and the second adjustable knife serves for cutting off the rules or leads to their proper length, the application of my improved machine for cutting printers' rules and leads is considerably enlarged and the same adapted in a high degree to the various uses of a printing-office.

Having thus described my invention, what I claim as new, and desire to secure by Letters Patent, is—

1. The combination, with a stationary cutting-knife, of an oscillating knife-holder provided with a fixed cutting-knife and with an adjustable cutting-knife adjacent thereto, said latter being adapted to be adjusted parallel with or at an angle of inclination to the edge of the stationary cutting-knife, substantially as set forth.

2. The combination, with a supporting-standard having a stationary cutting-knife attached thereto, of an oscillating knife-holder pivoted to said standard, an actuating-lever also pivoted to said standard and connected by pivot-links with the upper part of the knife-holder, means for retaining and guiding the outer end of the knife-holder, a fixed knife attached to the knife-holder, and an adjustable knife arranged adjacent to the fixed knife on the knife-holder, substantially as set forth.

3. In a machine for cutting printers' rules and leads, an oscillating knife-holder with a fixed cutting-knife secured thereto and an adjustable cutting-knife arranged adjacent to the fixed knife, said adjustable knife being pivoted to the knife-holder and adjusted to different inclinations on the same by set-screws that engage the upper edge of the adjustable knife, substantially as set forth.

4. The combination of a supporting-standard having a slotted quadrantal arm, a stationary cutting-knife attached to said standard, an inclined guide-plate extending from the arm to the stationary cutting-knife, means for adjusting said guide-plate to different inclinations on the quadrantal arm, a vertically-guided and spring-actuated follower arranged alongside of the edge of the stationary cutting-knife, and an oscillating cutting-knife above the follower, substantially as set forth.

5. In a machine for cutting printers' rules and leads, a supporting-frame composed of an upright standard, a laterally-extending horizontal guide-arm, a quadrantal arm connecting the upper end of the vertical standard with the guide-arm, and an upwardly-extending slotted guide-lug, all made integral with each other, substantially as set forth.

In testimony that I claim the foregoing as my invention I have signed my name in presence of two subscribing witnesses.

FERDINAND WESEL.

Witnesses:
PAUL GOEPEL,
CHARLES SCHROEDER.